(No Model.) 4 Sheets—Sheet 1.

G. W. STAFFORD.
PATTERN MECHANISM FOR LOOMS.

No. 466,875. Patented Jan. 12, 1892.

WITNESSES:
Albert L. Bodwell,
James E. Arnold

INVENTOR:
George W. Stafford
By Benj. Arnold Atty (No Model.) 4 Sheets—Sheet 2.

G. W. STAFFORD.
PATTERN MECHANISM FOR LOOMS.

No. 466,875. Patented Jan. 12, 1892.

WITNESSES:
Albert L. Bodwell,
James E. Arnold

INVENTOR:
George W. Stafford
By
Benj. Arnold ATTORNEY (No Model.) 4 Sheets—Sheet 3.

G. W. STAFFORD.
PATTERN MECHANISM FOR LOOMS.

No. 466,875. Patented Jan. 12, 1892.

WITNESSES:
Albert L. Bodwell.
James E. Arnold

INVENTOR
George W. Stafford
By
Benj. Arnold Atty (No Model.) 4 Sheets—Sheet 4.

G. W. STAFFORD.
PATTERN MECHANISM FOR LOOMS.

No. 466,875. Patented Jan. 12, 1892.

WITNESSES:
Albert L. Bodwell,
James E. Arnold

INVENTOR
George W. Stafford
By
Benj. Arnold ATTORNEY

UNITED STATES PATENT OFFICE.

GEORGE W. STAFFORD, OF PROVIDENCE, RHODE ISLAND.

PATTERN MECHANISM FOR LOOMS.

SPECIFICATION forming part of Letters Patent No. 466,875, dated January 12, 1892.

Application filed March 14, 1891. Serial No. 385,016. (No model.)

*To all whom it may concern:*

Be it known that I, GEORGE W. STAFFORD, of Providence, in the county of Providence and State of Rhode Island, have invented certain new and useful Improvements in Pattern Mechanisms for Looms; and I do hereby declare that the following is a full, clear, and exact description thereof, reference being had to the accompanying drawings, and to the letters of reference marked thereon, which form a part of this specification.

The objects of my invention are, first, to dispense with the long, heavy, and cumbrous pattern-chains which ordinarily have had to be employed heretofore in the production of certain woven fabrics and enable the fabric woven in a loom to be given the desired weave or pattern through the use of a pattern-chain of minimum length, and, second, to relieve the pegs or other indicators used upon the pattern-chain from the labor and strain incident to acting as cams in moving the indicator fingers or levers and parts connected therewith.

My invention is particularly adapted for utilization in connection with the shuttle-box-changing mechanism of looms, and I have shown it in the accompanying drawings combined with a form of box-operating mechanism, which, in the essential features thereof, is the same as in my United States Patent, No. 455,772, dated July 14, 1891, to which reference may be had.

Figure 1:
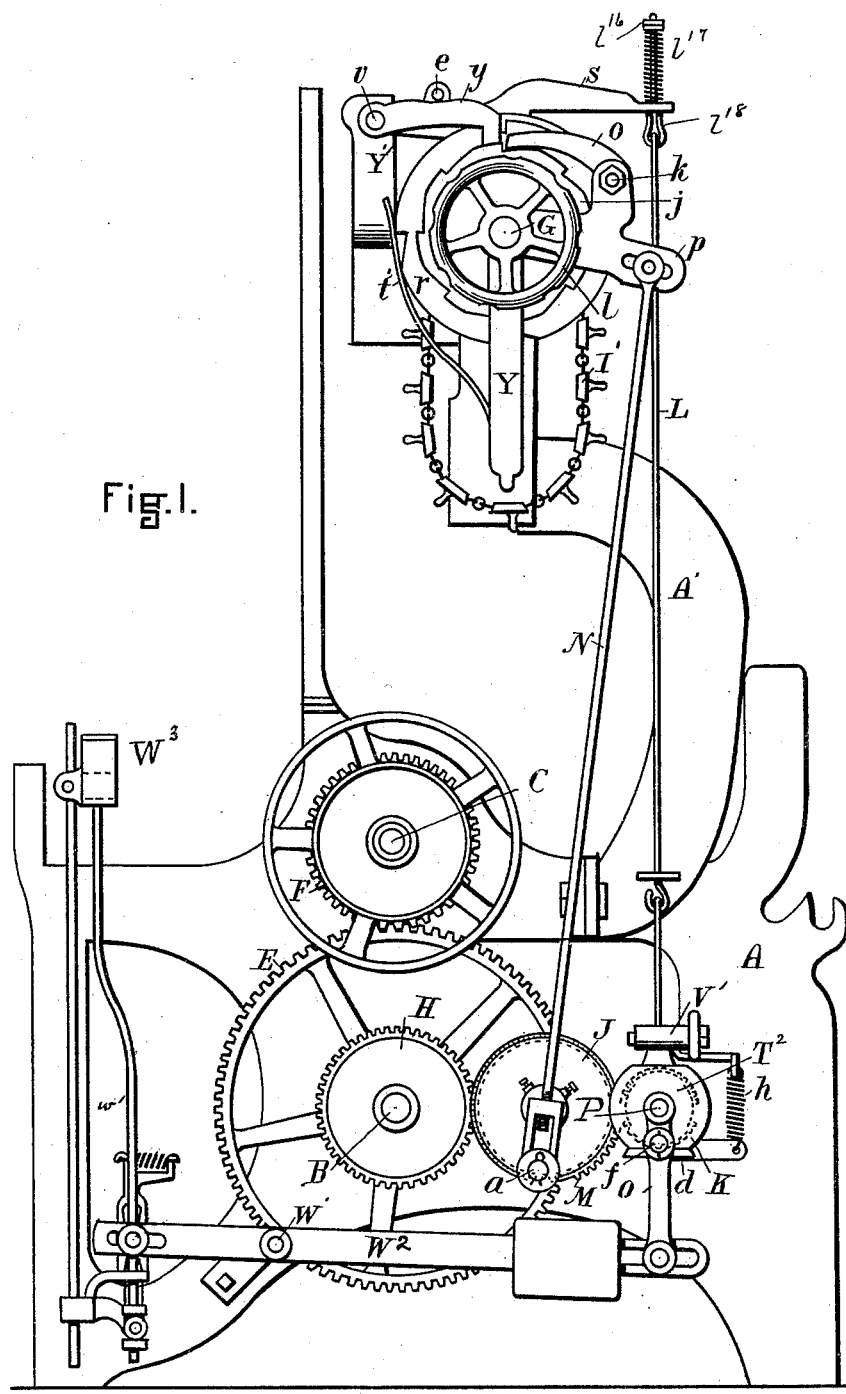
Figure 2:
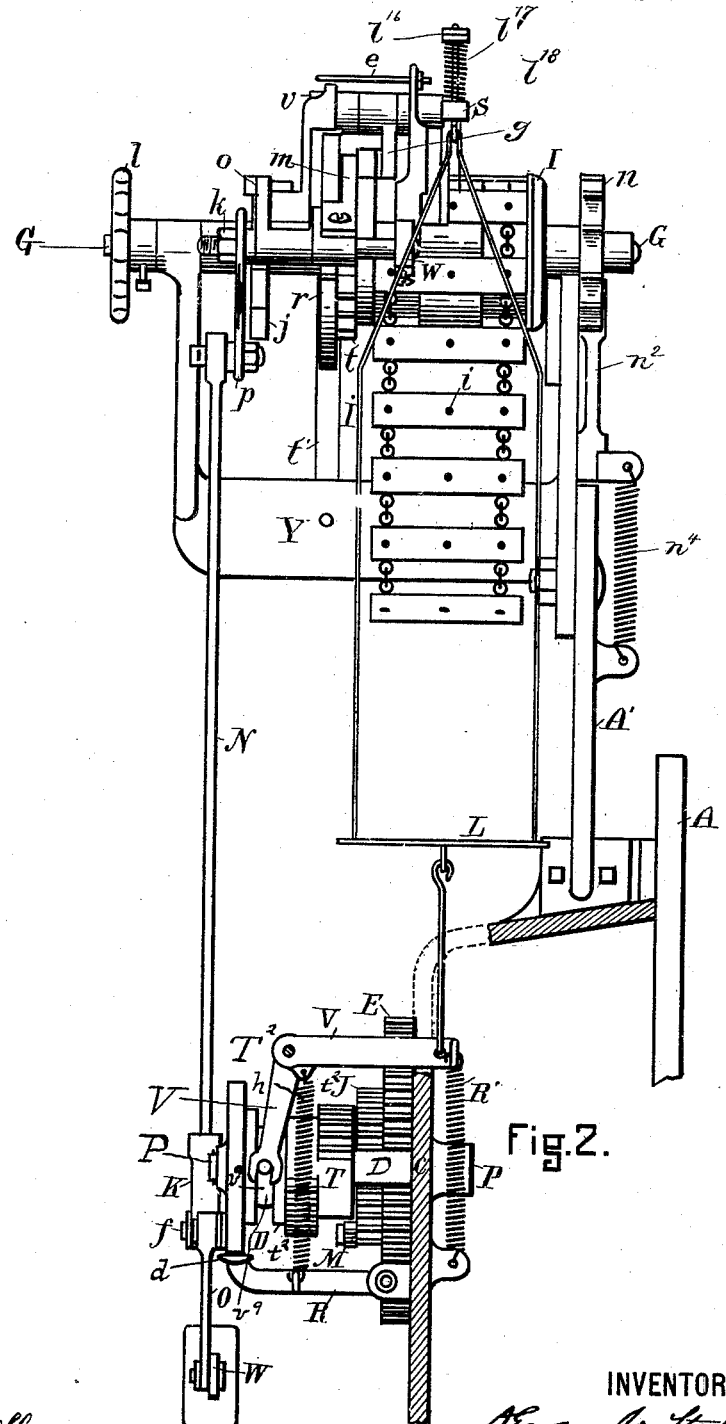
Figure 3:
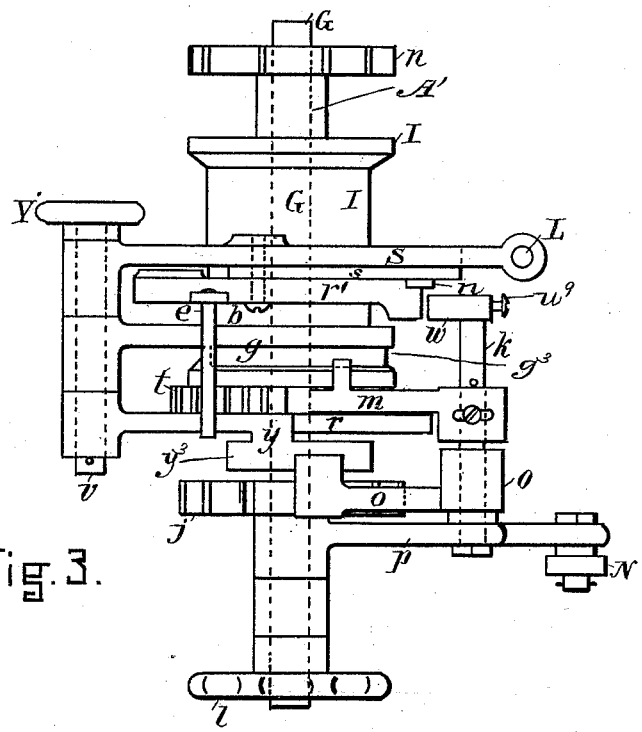
Figure 6:
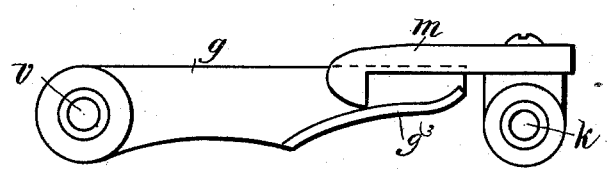
Figure 7:
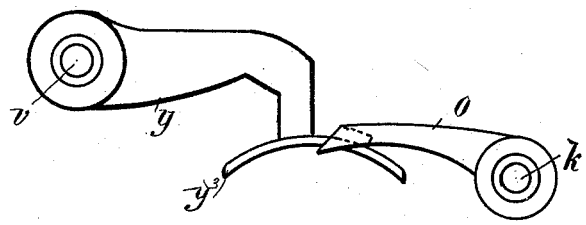
Figure 4:
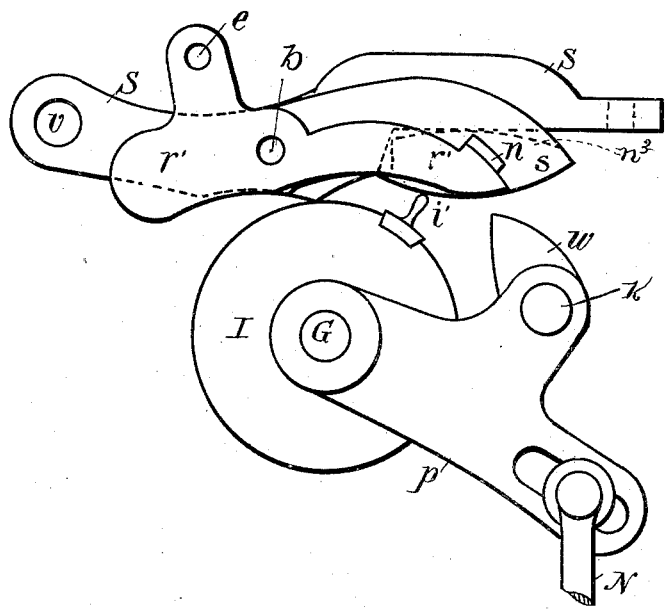
Figure 5:
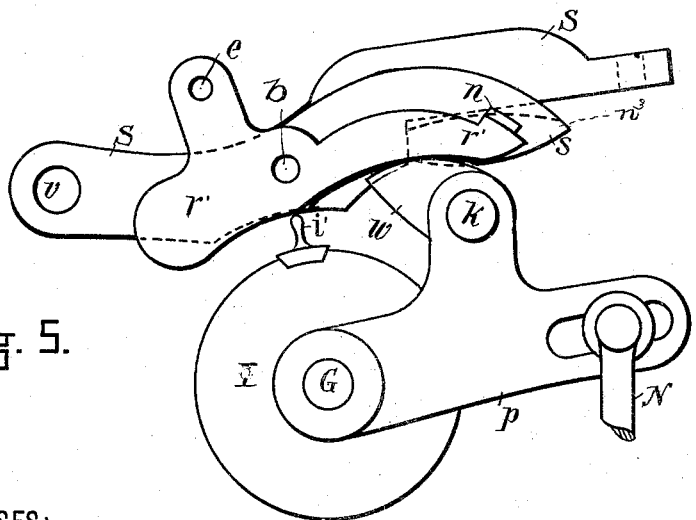

In the drawings, Figure 1 is a view in side elevation of a loom-frame having applied thereto change shuttle-box-operating mechanism with which my invention is applied. Fig. 2 is a view in rear elevation of the shuttle-box-operating mechanism and my improved pattern mechanism and parts of the supports therefor. Fig. 3 is a plan view of the pattern mechanism. Figs. 4 and 5 are views of certain parts of the pattern mechanism, representing such parts in different positions. Figs. 6 and 7 are separate detail views representing the pawls employed for actuating, respectively, the pattern-barrel and the auxiliary pattern-surface and the pawl-rests and pawl-rest-carrying levers co-operating with the said pawls.

A is the loom-frame.
B is the cam-shaft.
C is the crank-shaft.
E and F are the gear-wheels by means of which the cam-shaft is rotated from the crank-shaft.

H is a gear-wheel on the cam-shaft B, meshing with and driving a gear-wheel J, mounted on a stud carried by the loom-frame, and M is a gear-segment carried by and rotating with the gear-wheel J. A stud P is fixed to the loom-frame adjacent to wheel J, and upon the said stud is mounted to turn a sleeve D, which carries at its outer end a disk $T^2$, provided with a crank-pin $f$. A rod $o$ connects the crank-pin $f$ with one end of the shuttle-box lever $W^2$, which is pivoted upon a stud $W'$, carried by the loom-frame and at the opposite end thereof is connected with the rod $W'$ of the shuttle-boxes $W^3$. Upon sleeve D is mounted a double segmental gear T, this gear T being so mounted on the sleeve as to have capacity to move longitudinally of the sleeve, but being so connected with the sleeve, as by a spline, as to be compelled to rotate in unison therewith. The segments $t^2$ $t^2$ are oppositely disposed upon the gear T, and the said segments are out of line with each other laterally, so that after the gear has been moved longitudinally upon the sleeve to bring one of the said segments $t^2$ into position for being engaged by the segment M upon gear-wheel T and the engagement has occurred, and thereby the gear T and crank-disk $T^2$ have been given a half-revolution to carry the crank-pin $f$ from one extreme of its stroke to the other and change the position of the shuttle-boxes, the segment M runs out of mesh with gear T, and the latter and the crank-disk have no further movement of rotation until the gear T is again moved longitudinally upon the sleeve to bring the other of said segments $t^2$ into position for being engaged by the segment M. The disk $T^2$ is flattened on opposite sides of its center, as shown in Fig. 1, and with the flattened portions engages the end of the locking-lever R, which is pivoted upon the loom-frame and is drawn against the edge of the disk by the spring $h$. The gear T is moved longitudinally upon the sleeve D by means of a bell-crank lever V, one end of which is connected with a collar $v^9$, passing around gear T, while the other is connected by a yoke L with the pattern mechanism, the lever V being acted upon by a spring R', which tends to hold the lever V and gear T in the position represented in Fig. 2.

The construction and mode of operation of the box-changing devices which I have shown and herein briefly described will be found fully presented in my patent aforesaid, wherein I have laid claim to the construction thereof. I have represented such construction herein for the purpose of making a practical disclosure of the manner of applying and reducing to practice my improvements in pattern mechanism for looms.

The yoke L is connected at its upper end with the indicator lever or finger S. In Figs. 1 and 2 of the drawings a rod $l^{18}$ is shown as connecting the yoke to the indicator lever or finger S, this rod being hooked at its lower end to engage with the upper end of the yoke and being passed through the end of the lever or finger S, above which it is surrounded by a spiral spring $l^{17}$, and has a nut $l^{16}$ applied to its upper end. The movement of the sliding double segmental gear longitudinally of the sleeve D inward from the position shown in Fig. 2 is occasioned by the lifting of the lever or finger S by the devices co-operating therewith in the pattern mechanism. The positions to be assumed by the lever or finger S are dictated by the arrangement of the pins, pegs, or other indicators $i'$, that are applied to the pattern-chain W, which passes over the pattern-barrel I. The said pattern-barrel I is fixed on a shaft G, having bearings in a support Y, carried by an arm A', affixed to the loom-frame A. Upon shaft G is a fixed ratchet-wheel $j$, that is engaged for the purpose of rotating the pattern-barrel by a push-pawl $o$, swinging on a long stud $k$ projecting from the side of a swinging arm or pawl-carrier $p$, hung loosely on the shaft $g$, the said arm or pawl-carrier $p$ being connected by a rod N with a crank-pin $a$ on the side of wheel J, and being thereby operated to cause pawl $o$ to rotate the shaft G and the pattern-barrel.

For the purpose of producing dwells in the rotation of the pattern-barrel when desired and permitting particular bars of the pattern-chain to act respectively for as long a period in the weaving as it may be desired to proceed without changes in the positions of the parts under the control of indicator lever or finger S, and for thereby rendering unnecessary the use in the pattern-chain of a number of bars all alike as respects the presence or absence of indicators, I employ a pattern-disk $r$, formed with one or more notches in its periphery and having connected therewith a ratchet-wheel $t$, the teeth of this ratchet-wheel being engaged for the purpose of rotating the disk $r$ by a draw-pawl $m$, loosely pivoted on the stud $k$, fixed to the arm or pawl-carrier $p$. The pawls $o$ $m$ act alternately in imparting movements of rotation to the pattern-barrel and the disk $r$. The said disk $r$ constitutes an auxiliary pattern device for determining the engagement of pawl $o$ with ratchet-wheel $j$, and acts against a lever $y$, which is provided or formed with a segmental flange $y^3$, that projects laterally into proximity to the ratchet-wheel $j$, and near enough to the said wheel to extend under a portion of the free end of the pawl $o$. When the lever $y$ rests in a notch in the periphery of the disk $r$, the pawl $o$ is permitted to engage with the teeth of ratchet-wheel $j$ and rotate the pattern-barrel; but when the disk is turned so as to carry the notch out from under the free end of the lever $y$, the periphery of the disk acts to raise the lever $y$ high enough to lift pawl $o$ out of engagement with the teeth of ratchet-wheel $j$, and so long as the lever $y$ continues to be held thus raised the pattern-barrel remains without movement of rotation. The rotation of the auxiliary pattern-surface itself is controlled from the pattern-chain passing around the pattern-barrel in a manner similar to that in which the rotation of the pattern-barrel is controlled from disk $r$, one of the rows of the indicators $i'$ upon the said pattern-chain being utilized to determine the position of a lever $g$, having or formed with a pawl-rest $g^3$, which projects laterally from lever $g$ far enough to underlie a portion of the free end of the draw-pawl $m$. Consequently the position of lever $g$ determines whether or not the auxiliary pattern-surface shall be rotated by its pawl $m$.

In order to secure a compact and simple structure, I mount the auxiliary pattern-surface or disk $r$ and its ratchet-wheel $t$ upon the shaft G, so as to turn loosely thereon at one side of the pattern-barrel and hang the three levers S, $g$, and $y$ upon a single stud $v$, fixed in the support Y' on the side of the shaft G which is opposite to the side of said shaft on which stud $k$ is placed.

Instead of causing the indicators $i'$ upon the pattern-chain to act as cams in lifting the indicator-lever S when such lever should be raised, I utilize the said indicators merely to indicate the times when the said levers should be elevated, and employ specially-contrived devices having for their function to perform the actual lifting. To this end I pivot upon the side of lever S, upon one pin $b$, two levers $s$ and $r'$. Lever $s$ is provided at its free end with oppositely-extending lateral projections $n$ $n^3$. The first-mentioned projection $n$ extends over one end of lever $r'$, so as to limit the upward movement of said end relatively to lever $s$, while the last-mentioned projection $n^3$ extends under the lever S, as shown in dotted lines in Figs. 4 and 5. The end of lever $r'$, which comes in contact with projection $n$, is wedge-shaped, as is clearly shown in Figs. 4 and 5, while the opposite end is weighted, as shown, so as to cause said wedge-shaped end to bear normally against the projection $n$. On the stud $k$ is fixed a wedge $w$, intended to co-operate with the wedge-shaped end of lever $r'$. The levers $r'$ and $s$ constitute what I call a "compound selector." The indicators $i'$ of the pattern-chain are intended to co-operate with lever $s$. The normal position of the parts as occupied by them when no indicator $i'$ on the pattern-chain is acting to lift the free end of the lever $s$ is such that at each inward movement of the wedge $w$ its point passes above the point of the wedge-shaped portion of lever $r'$. When, however, an indicator is presented under the free end of lever $s$, it raises the said free end slightly, as in Fig. 4. As lever $s$ is thus moved by the indicator, the weighted rear end of lever $r'$ causes its end having the wedge-shaped portion to follow and remain in contact with projection $n$, as shown in Fig. 4. This carries the wedge-shaped portion of lever $r'$ above the point of wedge $w$, and now in the ensuing inward movement of wedge $w$ the said wedge strikes against the under side of the wedge-shaped portion of lever $r'$ and raises the said lever, carrying upward with it lever $s$, the projection $n^3$ of lever $s$ acting to carry upward the indicator lever or finger S. Simultaneously the pattern-barrel is carried forward one step by the action of pawl $o$ on ratchet-wheel $j$, and in this movement of the barrel the indicator which acted upon lever $s$, as just described, is carried onward until it has passed under a part of the lever or finger S, where it remains, sustaining the said lever S until the said indicator is carried onward from beneath the lever S by the continued rotation of the pattern-barrel. In order that when lever $y$ is held elevated by the auxiliary pattern-surface $r$ and the pattern-barrel thereby is caused to remain without movement of rotation, the wedge $w$ may not unnecessarily act upon lever $r'$ to raise it. A pin $e$ is made fast in the said lever $r'$ back of its pivot, this pin projecting laterally and over the lever $y$ into position to be struck by the said lever $y$ when the latter is raised. Thereby when the auxiliary pattern-surface acts upon lever $y$ to lift pawl $o$ out of engagement with the teeth of ratchet-wheel $t$ and arrests the rotation of the pattern-barrel it also causes the wedge-shaped end of lever $r'$ to be depressed below the line of travel of the pointed end of the wedge $w$. A hand-wheel $l$ is made fast on the outer end of the shaft G to enable the pattern-barrel to be turned by hand when necessary and set as desired. A stop or rest wheel $n$ is made fast to the inner end of the said shaft and is acted upon by a presser $n^2$, having a spring $n^4$ for causing it to bear against the wheel $n$. A friction-spring $t'$ is applied to the edge of the disk $r$ to prevent it from overrunning when moved quickly by the pawl $m$.

I claim as my invention—

1. The combination, with a pattern-barrel, of an auxiliary pattern-surface arranged in line axially with said pattern-barrel, ratchet-wheels connected with said pattern-barrel and auxiliary pattern-surface, pawls in engagement with said ratchet-wheels, means for actuating said pawls to effect the alternate actuation of said ratchet-wheels, a stud on one side of the axial line of the pattern-barrel and auxiliary pattern-surface, a lever mounted on said stud and acted upon by a row of indicators passing around the pattern-barrel and having a pawl-rest for the pawl which actuates the auxiliary pattern-surface, and a second lever mounted on said stud and acted upon by the auxiliary pattern-surface and having a pawl-rest for the pawl which actuates the pattern-barrel, substantially as described.

2. The combination, with the indicating-lever S, of the means for determining the position thereof and for raising the same without causing strain on the pattern pins or pegs, consisting of the pattern-barrel, means for rotating the said pattern-barrel, the levers $s$ and $r'$, pivoted to the lever S, and the reciprocating wedge $w$, substantially as described.

3. The combination, with the indicating-lever S, of the levers $s$ and $r'$, pivoted to lever S, the pattern-barrel, an auxiliary pattern-surface, the wedge $w$, means for actuating the said wedge and the pattern-barrel and auxiliary pattern-surface, a lever acted upon by a row of indicators passing around the pattern-barrel and controlling the rotation of the auxiliary pattern-surface, a second lever acted upon by the auxiliary pattern-surface and controlling the rotation of the pattern-barrel, and a pin $e$, carried by the lever $r'$ and acted upon by the lever last mentioned, substantially as described.

4. The combination, with the indicating-lever S, of the levers $s$ and $r'$, pivoted to the lever S, the pattern-barrel, its ratchet-wheel, the pawl to engage said ratchet-wheel to turn the same and the pattern-barrel, an auxiliary pattern-surface, its ratchet-wheel, a pawl for engaging said ratchet-wheel to turn the same and the auxiliary pattern-surface, the wedge $w$, means for actuating the said wedge and the said pawls, a lever acted upon by a row of indicators passing around the pattern-barrel and having a pawl-rest for the pawl which actuates the auxiliary pattern-surface, a second lever acted upon by the auxiliary pattern-surface and having a pawl-rest for the pawl which actuates the pattern-barrel, and a pin $e$, carried by lever $r'$ and acted upon by the lever last mentioned, substantially as described.

5. The combination, with the indicating-lever S and the pattern-barrel, of a selector pivoted to said lever S and having a wedge-shaped portion, a wedge for engaging with the wedge-shaped portion of the selector, an auxiliary pattern-surface, ratchet-wheels connected with the pattern-barrel and auxiliary pattern-surface, pawls engaging with said ratchet-wheels, a reciprocating carrier common to the pawls and wedge, a lever acted upon by a line of indicators on the pattern-barrel and controlling the engagement of one of said pawls with the ratchet-wheel of the auxiliary pattern-surface, and a second lever acted upon by the auxiliary pattern-surface and controlling the engagement of the other of said pawls with the ratchet-wheel of the pattern-barrel, substantially as described.

6. The combination, with the indicating-lever S and the pattern-barrel, of a selector pivoted to said lever S and having a wedge-shaped portion, a wedge for engaging with the wedge-shaped portion of the selector, an auxiliary pattern-surface, means for actuating the wedge and the pattern-barrel and the auxiliary pattern-surface, a lever acted upon by the auxiliary pattern-surface and controlling the actuation of the pattern-barrel, and a pin $e$, carried by the selector and acted upon by the lever last mentioned, substantially as described.

GEO. W. STAFFORD.

Witnesses:
CHARLES H. POLAND,
BENJ. ARNOLD.